May 20, 1930.  F. S. RODE  1,759,714
BRAKE TESTER
Filed Sept. 20, 1928   2 Sheets-Sheet 1
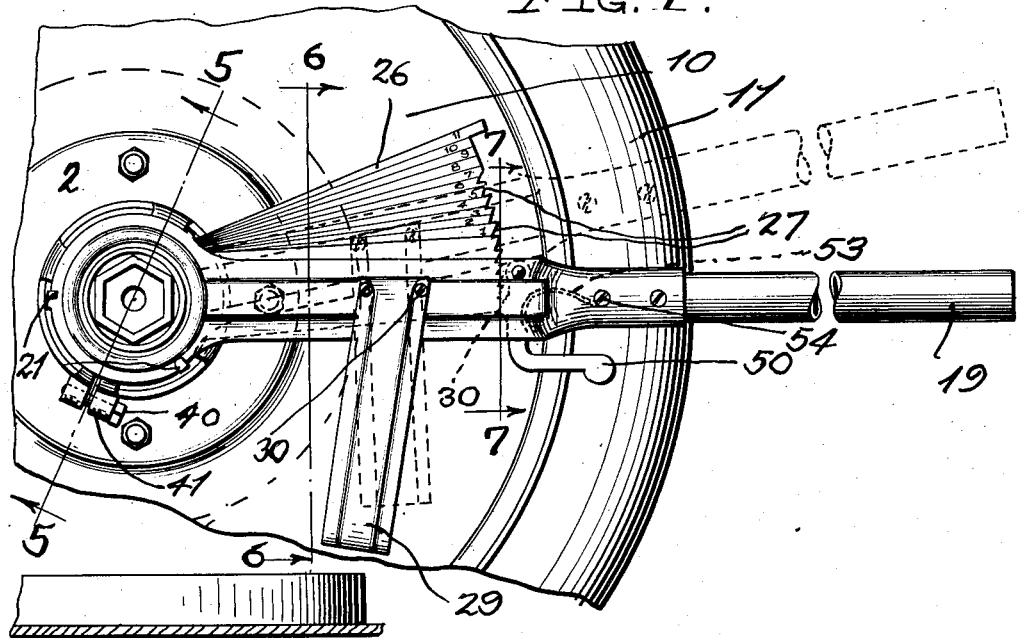
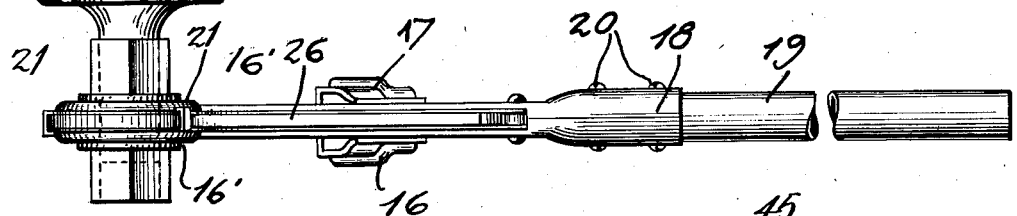
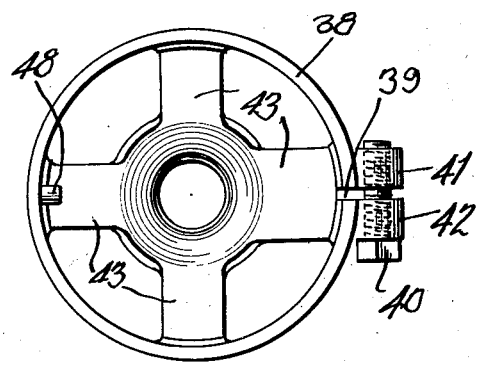
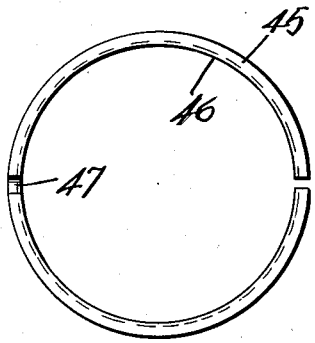
INVENTOR.
F. S. Rode
BY
Bryant Lowry
ATTORNEYS.

May 20, 1930.  F. S. RODE  1,759,714
BRAKE TESTER
Filed Sept. 20, 1928  2 Sheets-Sheet 2
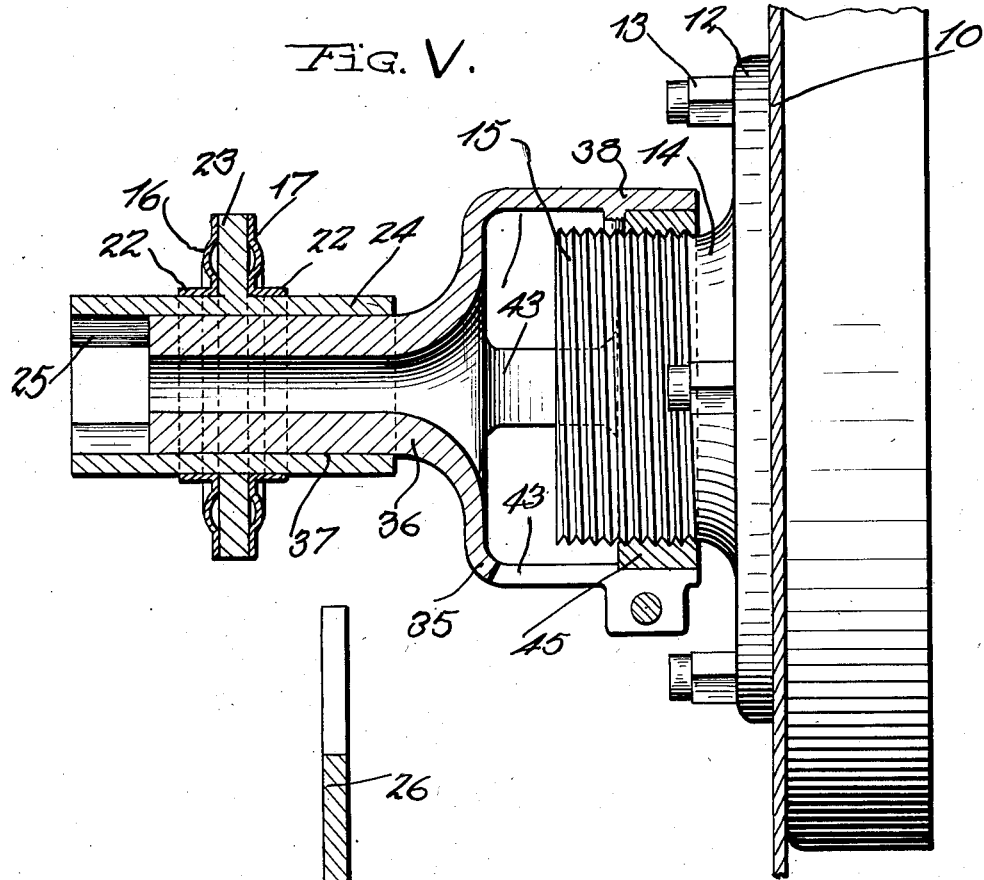
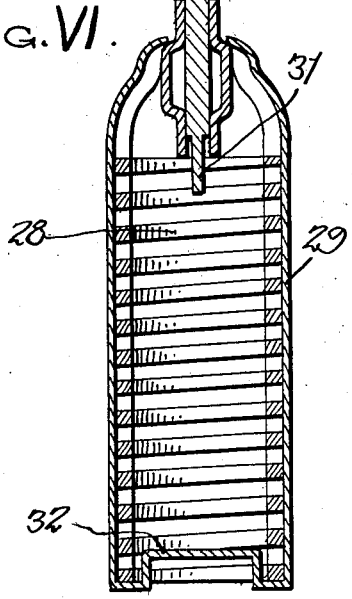
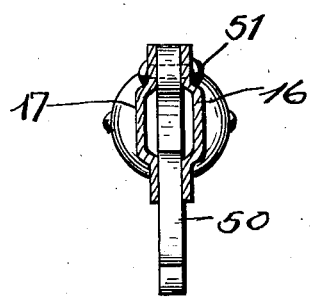
INVENTOR.
F. S. Rode
BY Bryant & Lowry
ATTORNEYS Patented May 20, 1930

1,759,714

UNITED STATES PATENT OFFICE

FRANK S. RODE, OF JEANNETTE, PENNSYLVANIA

BRAKE TESTER

Application filed September 20, 1928. Serial No. 307,147.

This invention relates to brake testing devices of the type employed for testing brakes on motor vehicles and the like.

The primary object of this invention is to provide a brake testing device of the above mentioned character adapted to be employed in an automobile garage or accessory store, whereby the brakes of a car or the brakes of different types of cars may be adapted and tested, without necessitating a different brake testing instrument.

A further object of this invention, is to provide a device of the above mentioned character, having a detachable hub connection for adapting the brake testing device to different types of cars having different sized hub caps and screw threaded hub projections.

A still further object of this invention is to provide a brake testing device which may be employed with accuracy while adjusting the brakes on an automobile and which may be used as garage equipment for testing brakes on all makes of automobiles.

A still further object of this invention, is to provide a brake testing device, which is simple in operation, having comparatively few parts to get out of order and having means for quickly detaching or attaching the device to a vehicle wheel to be adjusted or tightened.

Other objects and advantages of this invention, will become apparent during the course of the following description, forming a part of this specification and in which, Figure 1 is a longitudinal elevational view of a device showing the same in operative position upon a vehicle wheel;

Figure 2 is a longitudinal plan view of the device also showing the same applied to the hub of a fragmentary portion of a vehicle wheel;

Figure 3 shows the hub connecting device which may be readily detached from the hub and detached from the brake testing device;

Figure 4 shows a plan view of an internally threaded ring adapted to be inserted in the connecting device for accommodating different threads on different makes of vehicles;

Figure 5 is a cross-sectional view on line 5—5 of Figure 1, showing the manner and arrangement of the connector part associated with the vehicle hub;

Figure 6 is a cross-sectional view through line 6—6 of Figure 1 showing the spring housing device and the relation of the registering arm therwith; and Figure 7 is a cross-sectional view through line 7—7 of Figure 1, showing the attached mechanism for holding the indicating arm in a raised position, while the brake testing device is being employed.

In the drawings, wherein for the purpose of illustration is shown a preferred embodiment of invention, attention being called to Figures 1 to 7 inclusive, the numeral 10 designates a disk wheel, having the usual type of pneumatic tire 11. The disk wheel 10 is secured to the hub portion 12 by bolts 13 or other securing devices. The usual hub portion extension 14 is provided and is screw threaded at 15 to accommodate the hub cap or guard cap.

The above description has been outlined to set forth a wheel structure, merely for the purposes of illustrating the manner in which the invention is to be employed.

The invention embodies a pair of frame plates 16 and 17 having circular end disk portions 16′ and having an enlarged ferrule portion 18 at the opposite end thereof. A handle 19 is secured in the ferrule portion 18 by rivets or screws 20 for forming grasping means to the operator. The side plates 16 and 17 are secured at the disk portions by lugs 21 which are adapted to firmly hold the side plates in spaced relation.

The disk portions 16′ are provided with flanges 22 to form a bearing for the disk member 23. The disk member 23 is formed on a cylindrical enclosed wrench 24 having a plurality of facets 25. Also formed on the disk portion 23 is a sector indicator 26 having graduations on the arcuate portion thereof and also having a series of ratchet teeth 27.

The sector 26 is movable between the side frame plates 16 and 17 and it is held in the position shown in Figure 1 by a coiled spring 28 suitably housed in a spring casing 29 secured in any suitable manner to the side plates 16 and 17 by bolts indicated at 30. A projection 31 is formed on the sector plate 26 for projecting into the coil spring 28 and thereby maintains the position of the spring 28 in respect to the casing 29. At the opposite end of the casing is provided an obstructor portion 32 which engages the lower end of the coiled spring 28 for holding the same in place in respect to the casing 29.

A device 35 is provided for the brake testing implement above described, to the hub of different vehicles and includes a shank portion 36 having a plurality of facets 37 to correspond to the facets 25 on the wrench member 24. The opposite end of the connecting device 35 is formed into a ring 38 split as at 39 and secured together by the bolt 40 threaded through the lugs 41 and 42. The ring 38 is connected to the shank portion 36 by spider elements 43 in order to provide resiliency to the ring member 38.

A plurality of threaded split rings 45 may be provided corresponding to the screw threads on the hub portions of different types of vehicles and they are adapted to be independently inserted in the clamping ring 38 as shown in Figures 1, 2 and 5. Each ring 45 is provided with screw threads 46 to fit the screw threaded hub portion 15 and they are also provided with an opening 47 for receiving a pin 48 on the split ring 38 for holding the screw threaded split ring 45 against rotation therein.

A pawl 50 is pivoted between the frame members 16 and 17 by a pivot pin 51 as shown in Figure 7. The pawl 50 is provided with a projected portion 52 which is adapted to engage the ratchet teeth 27 for holding the indicating segment 26 in place after a reading has been taken upon the efficiency of an automobile brake. A leaf spring 53 is secured in the ferrule portion 18 by a screw 54 for pressing the pawl 50 into engagement with the ratchet teeth 27.

In the use of the brake testing device, the brake pedal of the motor vehicle is depressed and so held in any suitable manner at the foot pressure desired. The spanner or connecting device 35 is then threaded upon the hub 15 of the vehicle wheel as previously described, after which, the wrench member 24 is then placed upon the end 36 of the spanner or connecting device in interlocking engagement therewith. The handle 19 is then engaged and the leverage thereof combined with the members 16 and 17 when utilized for rotating the disk portions 16' upon the wrench member 24 and during which movement the coil spring 28 carried by the frame members 16 and 17 is moved toward the segment 26 effecting compression of the spring, this movement continuing until the vehicle wheels 10 start to turn, at which time, pressure on the handle 19 is relieved and the same is held in its shifted position relative to the segment 26 by the pawl 50 carried by the handle locking with the teeth 27 upon the end of the segment 26, thereby giving a reading of the pressure required for moving the vehicle wheels and establishing pressure of the wheel brake, it being understood that the handle continues in its movement to the point of the brake pressure of the wheel overcoming compression of the spring 28. The handle and associated parts is released from its locked position relative to the segment 26 by disengaging the pawl 50 from the ratchet teeth 27 of the segment and each wheel equipped with a brake may be separately tested, it being understood that the vehicle wheel is jacked up or elevated from the ground during the testing operation.

It is to be understood, that the forms of the invention herein shown and described are to be taken as preferred examples of the same and that various changes in the shape, size and arrangement of parts may be resorted to without departing from the spirit of the invention, or the scope of the sub-joined claims.

Having thus described the invention, I claim:—

1. In a brake testing device, a pair of frame members having a handle secured to one end thereof, a disk portion sandwiched between the frame members at the opposite end thereof, said disk portion having an indicating segment formed thereon, an enclosed wrench formed through the center portion of the disk member, a coiled spring for holding the segment portion of the disk member in inoperative position, and detachable means for connecting the enclosed wrench portion to the hub of a vehicle whereby the brakes of the vehicle may be tested.

2. In a brake testing device, a pair of frame members, a handle for said frame members at one end thereof, an inclosed wrench, rotatably mounted in the opposite end of said frame members, said enclosed wrench having an indicating segment extending between the pair of frame members, a coiled spring secured to the frame members for normally holding the indicating segment in inoperative position and against the rotation of the enclosed wrench in one direction, and means for detachably connecting the enclosed wrench member to the hub portion of a vehicle.

3. In a brake testing device, a pair of side frame members having a ferrule formed at one end thereof, a handle secured in said ferrule, there being a pair of disk members formed at the opposite ends of said frame members, each of said disk members having an opening therein, an enclosed wrench received in said opening, and an indicating segment secured to the enclosed wrench, said indicating segment extending between the side frame members, a coiled spring for holding the indicating segment against rotation in one direction only with respect to the frame members, and means for detachably securing the enclosed wrench member to the screw threaded portion of a vehicle hub whereby the efficiency of an automobile brake may be tested.

4. In a brake testing device, a pair of side frame members, said frame members terminating in a ferrule at one end, a handle secured in said ferrule, means formed at the opposite end of said frame members for housing an enclosed wrench, said means including opposite disk portions having openings through the central portions thereof, an enclosed wrench rotatably mounted in said openings, an indicating segment formed on the periphery of the enclosed wrench and extending between the side frame members, a coil spring secured to the side frame members for holding the indicating segment against rotation in one direction only with respect to the side frame members, means provided for holding the indicating segments against the action of the coil spring, and detachable means for securing the enclosed wrench to a screw threaded hub portion of a vehicle.

5. In a brake testing device, a pair of side frame members, there being ferrule portions formed at the end of said frame members, a handle secured in between said ferrule portions, there being a pair of disk members having openings through the central portion thereof formed at the opposite end of said side frame members, said disk members having annular flanges, an enclosed wrench rotatable in said flanged portions, an indicator segment secured to the enclosed wrench member, a spring for resisting movement of the indicator segment in one direction, there being graduations formed on the indicating segment for indicating the resistance of the automobile brakes, ratchet teeth formed on the opposite portion of the indicator segment for holding the indicating segment in position after a reading has been taken and a pawl secured to the frame members for engaging in said ratchet teeth, a connecting device having a shank portion adapted to be received in the facets of the enclosed wrench, and a screw threaded ring secured in the opposite end of said connecting device for detachably connecting the enclosed wrench to the screw threaded portion of a hub.

6. In a brake testing device, a pair of side frame members, a handle secured thereto, at one end thereof, there being a pair of disk members formed on the opposite ends of said frame members, an enclosed wrench rotatably mounted through openings formed in the disk members, an indicating segment formed on the enclosed wrench extending between the side frame members, there being graduations formed on said indicating segments, rack teeth formed on the outer arcuate portion of the indicating segment, a casing secured to the centralmost portion of the frame members, a coiled spring housed therein and adapted to engage the indicating segment for holding the same against rotation in one direction only with respect to the side frame members, and a connecting device for detachably connecting the enclosed wrench to a screw threaded portion of a vehicle hub, said detachable connection including a shank portion adapted to be received in the enclosed wrench member, a split ring, said split ring being connected to the shank portion by a spider arrangement, and a split internally screw threaded ring adapted to be received in the detachable connection ring for engaging the screw threaded hub portion of a vehicle.

7. In a brake testing device, a spanner adapted for rigid mounting upon a vehicle wheel hub, a socket wrench interlocked with the spanner, a gauge plate on the socket wrench, a handle rotatable on the wrench and comprising a pair of spaced members straddling the gauge plate, a casing extending laterally of the spaced members, and a spring in the casing engaged with the gauge plate to resist movement of the handle over the gauge plate to rotate the wheel against brake pressure thereon.

8. In a brake testing device, a spanner adapted for rigid mounting upon a vehicle wheel hub, a socket wrench interlocked with the spanner, a gauge plate on the socket wrench, a handle rotatable on the wrench and comprising a pair of spaced members straddling the gauge plate, a casing extending laterally of the spaced members, a spring in the casing engaged with the gauge plate to resist movement of the handle over the gauge plate to rotate the wheel against brake pressure thereon, and means for holding the handle in its shifted position relative to the gauge plate.

In testimony whereof I affix my signature.

FRANK S. RODE.